(12) United States Patent
Liu et al.

(10) Patent No.: US 11,097,634 B2
(45) Date of Patent: Aug. 24, 2021

(54) START CONTROL SYSTEM OF VEHICLE AND VEHICLE HAVING THE SAME

(71) Applicant: BYD COMPANY LIMITED, Guangdong (CN)

(72) Inventors: Yanchu Liu, Guangdong (CN); Xiaoping Pan, Guangdong (CN); Fuzhong Pan, Guangdong (CN); Cong Wang, Guangdong (CN); Aili Ma, Guangdong (CN)

(73) Assignee: BYD COMPANY LIMITED, Shenzhen (CN)

( * ) Notice: Subject to any disclaimer, the term of this patent is extended or adjusted under 35 U.S.C. 154(b) by 353 days.

(21) Appl. No.: 15/612,868

(22) Filed: Jun. 2, 2017

(65) Prior Publication Data

US 2017/0267195 A1 Sep. 21, 2017

Related U.S. Application Data

(63) Continuation of application No. PCT/CN2015/097017, filed on Dec. 10, 2015.

(30) Foreign Application Priority Data

Dec. 10, 2014 (CN) .......................... 201410758912.5

(51) Int. Cl.
*B60L 58/25* (2019.01)
*B60W 10/26* (2006.01)
(Continued)

(52) U.S. Cl.
CPC ............... *B60L 58/25* (2019.02); *B60L 1/003* (2013.01); *B60L 15/00* (2013.01); *B60L 58/24* (2019.02);
(Continued)

(58) Field of Classification Search
None
See application file for complete search history.

(56) References Cited

U.S. PATENT DOCUMENTS 5,362,942 A * 11/1994 Vanderslice, Jr. ........ H02J 7/00
219/209
6,002,240 A * 12/1999 McMahan ......... H01M 10/4257
320/150
(Continued)

FOREIGN PATENT DOCUMENTS

CN 201032687 Y 3/2008
CN 101397008 A 4/2009
(Continued)

OTHER PUBLICATIONS

International Search Report and Written Opinion for Application No. PCT/CN2015/097017, dated Mar. 15, 2016, 11 pages.

*Primary Examiner* — Navid Ziaeianmehdizadeh

(57) ABSTRACT

The present invention provides a start control system of a vehicle, including: an electronic control unit (ECU), a starter, an air conditioner, and a starting power supply. The starting power supply includes a starting battery and a battery management system (BMS). At a low-temperature environment, when receiving an ignition request signal sent by the ECU, the BMS detects the temperature of the starting battery. When the temperature is less than a preset threshold, the starting battery is connected to the air conditioner for a preset time, so that the starting battery effectively raises the temperature of the starting battery by means of discharging at a high current temporarily. The start control system of a vehicle improves an ignition capability of a vehicle in a low-temperature environment, extends a temperature range and an area of using the vehicle, and improves competitive-
(Continued)

ness of the vehicle. The present invention further provides a vehicle having the start control system of a vehicle.

19 Claims, 6 Drawing Sheets

(51) Int. Cl.
| | | |
|---|---|---|
| *H01M 8/04* | (2016.01) | |
| *F02N 11/08* | (2006.01) | |
| *B60L 15/00* | (2006.01) | |
| *B60L 58/24* | (2019.01) | |
| *H01M 10/663* | (2014.01) | |
| *B60L 1/00* | (2006.01) | |
| *B60R 16/023* | (2006.01) | |
| *B60R 16/03* | (2006.01) | |
| *B60R 16/033* | (2006.01) | |
| *H01M 10/0525* | (2010.01) | |
| *H01M 10/48* | (2006.01) | |
| *H01M 10/42* | (2006.01) | |

(52) U.S. Cl.
CPC ........ *B60R 16/0231* (2013.01); *B60R 16/033* (2013.01); *B60R 16/0307* (2013.01); *B60W 10/26* (2013.01); *F02N 11/08* (2013.01); *F02N 11/0862* (2013.01); *H01M 8/04* (2013.01); *H01M 10/0525* (2013.01); *H01M 10/486* (2013.01); *H01M 10/663* (2015.04); *B60L 2210/10* (2013.01); *B60L 2240/34* (2013.01); *B60L 2240/545* (2013.01); *F02N 2011/0888* (2013.01); *H01M 2010/4271* (2013.01); *H01M 2220/20* (2013.01); *Y02T 10/70* (2013.01); *Y02T 90/16* (2013.01)

(56) References Cited

U.S. PATENT DOCUMENTS

| | | | | |
|---|---|---|---|---|
| 6,163,135 | A * | 12/2000 | Nakayama | B60K 6/445 |
| | | | | 320/150 |
| 6,271,648 | B1 * | 8/2001 | Miller | B60K 6/485 |
| | | | | 320/150 |
| 8,395,355 | B2 * | 3/2013 | Kaita | B60L 58/25 |
| | | | | 320/134 |
| 8,479,850 | B2 | 7/2013 | Nakata | |
| 8,571,735 | B2 * | 10/2013 | Koga | B60L 58/27 |
| | | | | 701/22 |
| 9,030,170 | B2 * | 5/2015 | Thiamtong | B60W 10/08 |
| | | | | 320/134 |
| 9,308,828 | B2 | 4/2016 | Wu et al. | |
| 9,340,121 | B2 | 5/2016 | Schwartz et al. | |
| 9,403,527 | B2 * | 8/2016 | Magnet | B60K 6/48 |
| 9,493,088 | B2 * | 11/2016 | Wei | H02J 7/0036 |
| 9,520,733 | B2 * | 12/2016 | Kitanaka | B60L 3/0046 |
| 9,821,810 | B2 * | 11/2017 | Gale | B60L 58/27 |
| 10,279,701 | B2 * | 5/2019 | Marchal | B60L 50/51 |
| 2002/0020381 | A1 * | 2/2002 | Pels | F02N 11/0862 |
| | | | | 123/179.3 |
| 2008/0053715 | A1 | 3/2008 | Suzuki et al. | |
| 2009/0067202 | A1 * | 3/2009 | Ichikawa | B60L 15/2045 |
| | | | | 363/79 |
| 2009/0251103 | A1 * | 10/2009 | Yamamoto | B60K 6/48 |
| | | | | 320/133 |
| 2010/0085019 | A1 * | 4/2010 | Masuda | H02J 7/1453 |
| | | | | 320/152 |
| 2010/0270976 | A1 * | 10/2010 | Tamura | B60L 58/27 |
| | | | | 320/136 |
| 2010/0324765 | A1 * | 12/2010 | Iida | B60L 58/25 |
| | | | | 701/22 |
| 2012/0021263 | A1 * | 1/2012 | Nishi | B60L 11/1875 |
| | | | | 429/62 |
| 2012/0038326 | A1 * | 2/2012 | Endo | B60K 6/445 |
| | | | | 320/162 |
| 2012/0261397 | A1 * | 10/2012 | Schwarz | B60L 58/27 |
| | | | | 219/202 |
| 2013/0249468 | A1 * | 9/2013 | Bajjuri | F02N 11/0825 |
| | | | | 320/104 |
| 2013/0317685 | A1 * | 11/2013 | Kinoshita | B60L 15/2045 |
| | | | | 701/22 |
| 2014/0076875 | A1 | 3/2014 | Gale et al. | |
| 2014/0266038 | A1 | 9/2014 | Gibeau et al. | |
| 2015/0084597 | A1 * | 3/2015 | Kim | H02J 7/0063 |
| | | | | 320/127 |
| 2016/0068167 | A1 * | 3/2016 | Wildgruber | F02D 29/06 |
| | | | | 701/22 |

FOREIGN PATENT DOCUMENTS

| | | |
|---|---|---|
| CN | 101962000 A | 2/2011 |
| CN | 102139646 A | 8/2011 |
| CN | 102198803 A | 9/2011 |
| CN | 102481913 A | 5/2012 |
| CN | 102738537 A | 10/2012 |
| CN | 203203186 U | 9/2013 |
| CN | 103419650 A | 12/2013 |
| CN | 203387214 U | 1/2014 |
| CN | 103879301 A | 6/2014 |
| EP | 0985570 A2 | 3/2000 |
| EP | 0985570 A3 | 3/2001 |
| JP | 1126032 A | 1/1999 |
| JP | H11-26032 | 1/1999 |
| JP | 2001197607 A | 7/2001 |
| WO | 2014/139542 A1 | 9/2014 |

\* cited by examiner

START CONTROL SYSTEM OF VEHICLE AND VEHICLE HAVING THE SAME

CROSS-REFERENCE TO RELATED APPLICATION

This application is a continuation application of International Application No. PCT/CN2015/097017, filed on Dec. 10, 2015, which is based on and claims priority to and the benefit of Patent Application No. 201410758912.5, filed with the STATE INTELLECTUAL PROPERTY OFFICE OF CHINA on Dec. 10, 2014. The entire contents of the above-identified applications are incorporated herein by reference.

TECHNICAL FIELD

The present invention relates to the technical field of vehicle manufacturing, and particularly to a start control system of a vehicle and a vehicle having the same.

RELATED ART

New energy vehicles are vehicles that adopt new power systems and mainly or completely use new energy, and include all-electric vehicles, plug-in hybrid vehicles, and fuel cell vehicles. The all-electric vehicles are vehicles driven by electric motors, where the driving power comes from an on-board rechargeable battery or another energy storage device. The plug-in hybrid vehicles are hybrid vehicles that have specific all-electric ranges and can obtain electric energy from an off-board device during normal use. The fuel cell vehicles are vehicles that use fuel cells as power sources.

In the fields of new energy vehicles and conventional fuel vehicles, when an engine operates normally, electric energy required by the power consuming system is mainly supplied by a generator. An on-board rechargeable battery has the following functions. (1) Start the engine: When the engine is being started, the on-board rechargeable battery supplies power to a starting system and an ignition system. (2) Backup power supply: When the engine operates at a low speed and the generator does not generate power or the generator has a relatively low voltage, the on-board rechargeable battery supplies power to a magnetic field winding of an alternating current generator, the ignition system, and another power consuming device. (3) Store electric energy: When the engine operates at a high speed and the generator supplies power normally, the on-board rechargeable battery converts extra electric energy of the generator into chemical energy and stores the chemical energy. (4) Collaborative power supply: When the generator is overloaded, the on-board rechargeable battery assists the generator in supplying power to the power consuming system. (5) Stabilize a supply voltage and protect an electronic device. The battery is equivalent to a high-capacity capacitor, and therefore not only can stabilize the voltage of an electric system of a vehicle, but also can absorb a transient overvoltage that is generated in the circuit, so as to prevent an electronic device from being damaged.

Among the foregoing functions, a major function of the battery is to start the engine. In the field of conventional fuel vehicles, during ignition and start of a vehicle, a starting power supply is usually first disconnected from an electric appliance at a low-voltage end. A starter is energized by using the starting power supply. The starter generates a torque that acts on the engine. The vehicle can be normally started only when the engine reaches a given rotating speed. To improve ignition performance of a lead-acid battery of a conventional vehicle at a low temperature, a lead-acid battery with a relatively high capacity or two lead-acid batteries are usually equipped. In this case, the cost is greatly increased. In addition, at a low temperature, the viscosity of sulfuric acid in a lead-acid battery is high, and therefore, internal resistance of the battery is multiplied. As a result, chemical reactions become slow. When a charging current is weak, the battery cannot be fully charged. Consequently, sulfation may occur, and the cycle life of the lead-acid battery is shortened. As a result, the problem of ignition at a low temperature may occur again soon. In addition, in another method, the surface of a starting battery is tightly attached to a thermistor, and at a low temperature an external power source is used to discharge power to the thermistor to heat the starting battery. It is very difficult to implement this method. Moreover, the mounting space is greatly increased, and the cost is increased.

SUMMARY

The present invention seeks to resolve one of the foregoing technical problems.

For this purpose, a first objective of the present invention is to provide a start control system of a vehicle.

A second objective of the present invention is to provide a vehicle having the start control system of a vehicle.

To achieve the foregoing objectives, according to a first aspect of the present invention, an embodiment provides a start control system of a vehicle, including: an electronic control unit (ECU), configured to send an ignition request signal; a starter; an air conditioner; and a starting power supply, where the starting power supply includes a starting battery; and a battery management system (BMS), configured to receive the ignition request signal sent by the ECU, and detect the temperature of the starting battery, where the BMS is further configured to connect the air conditioner to the starting battery when the temperature of the starting battery is less than a preset threshold, so that after the starting battery keeps discharging at a high current for a preset time, the starting battery provides a starting current to the starter.

According to the first aspect of the present invention, an embodiment provides a start control system of a vehicle, including: an ECU, configured to send a starting signal; an air conditioner; a high-voltage battery; a high-voltage distribution box; an electric motor; and a starting power supply, where the starting power supply includes a starting battery; and a BMS, configured to receive the starting signal sent by the ECU, and detect the temperature of the starting battery, where the BMS is further configured to connect the air conditioner to the starting battery when the temperature of the starting battery is less than a preset threshold, so that after the starting battery keeps discharging at a high current for a preset time, the high-voltage distribution box is controlled to be connected to the high-voltage battery and the electric motor.

According to some embodiments of the present invention, in a low-temperature environment, when receiving an ignition request signal or a starting signal sent by an ECU, a BMS detects the temperature of a starting battery. When the temperature is less than a preset threshold, the starting battery is connected to an air conditioner for a preset time, so that the starting battery effectively raises the temperature of the starting battery by means of discharging at a high current temporarily. Therefore, a starting capability of a vehicle is improved, and the temperature of an environment inside the vehicle is also raised. The start control system extends a temperature range and an area of using a vehicle and improves competitiveness of the vehicle.

In some examples, the starting battery is a lithium-ion battery. In some examples, a range of the high current is from 50 A to 450 A. In some examples, a range of the preset time is from 5 s to 30 s.

In some examples, the start control system further includes: a controller area network (CAN) bus, where the ECU is connected to the BMS by using the CAN bus, so as to implement information exchange between the ECU and the BMS.

In some examples, the start control system further includes: a control switch, where the BMS controls the control switch to be closed or opened to control the starting battery and the air conditioner to be connected or disconnected.

In some examples, the start control system further includes: a DC-DC converter, where the DC-DC converter includes a high voltage side and a low voltage side, the starting battery is connected to the low voltage side, the air conditioner is connected to the high voltage side, and the DC-DC converter is configured to convert a low-voltage output of the starting battery into a high-voltage output.

In some examples, the starting battery is connected to the air conditioner, so as to perform a continuous discharge at a high current to the starting battery.

In some examples, the start control system further includes: a compressor, where the compressor is connected to the high voltage side of the DC-DC converter, so as to increase load consumption of the starting battery.

In some examples, the start control system further includes: an engine control module (ECM); a generator; and a local interconnect network (LIN) bus, where the ECM is connected to the generator by using the LIN bus.

In some examples, the start control system further includes: a master control unit located in the high-voltage distribution box, where the starting battery is configured to control the master control unit to be closed or opened to control the high-voltage battery and the electric motor to be connected or disconnected.

According to a second aspect of the present invention, an embodiment provides a vehicle, where the vehicle includes the foregoing start control system of a vehicle.

According to some embodiments of the present invention, in a low-temperature environment, by means of a start control system of the vehicle, when receiving an ignition request signal or a starting signal sent by an ECU, a BMS detects the temperature of a starting battery. When the temperature is less than a preset threshold, the starting battery is connected to an air conditioner for a preset time, so that the starting battery effectively raises the temperature of the starting battery by means of discharging at a high current temporarily. Therefore, a starting capability of a vehicle is improved, and the temperature of an environment inside the vehicle is also raised. The vehicle has an extended temperature range and an extended area for use, and also has higher competitiveness.

Additional aspects and advantages of embodiments of present invention will be given in part in the following descriptions, become apparent in part from the following descriptions, or be learned from the practice of the embodiments of the present invention.

BRIEF DESCRIPTION OF THE DRAWINGS

These and other aspects and advantages of embodiments of the present invention will become apparent and more readily appreciated from the following descriptions made with reference to the drawings, in which.

DETAILED DESCRIPTION

Figure 1:
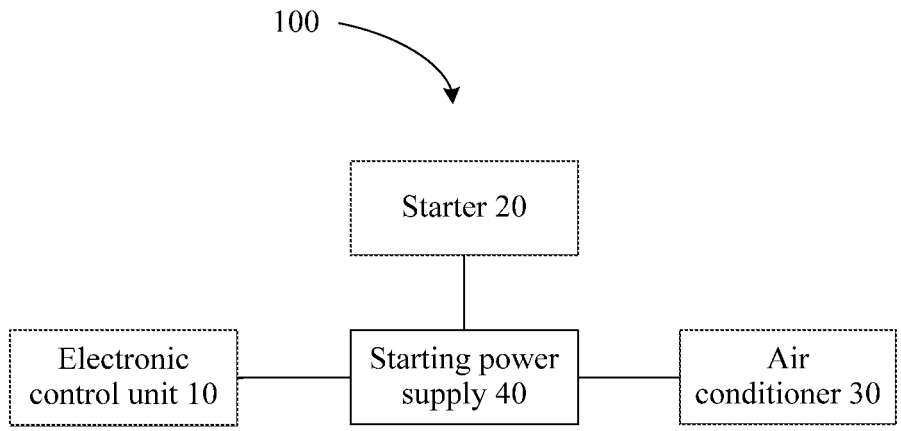
FIG. 1 is a schematic structural diagram of a start control system of a vehicle according to an embodiment of the present invention.

Reference will be made in detail to embodiments of the present invention. The embodiments described herein with reference to drawings are explanatory, illustrative, and should be used to generally understand the present invention. The embodiments shall not be construed to limit the present invention. The same or similar elements and the elements having same or similar functions are denoted by like reference numerals throughout the descriptions.

In the specification, unless specified or limited otherwise, relative terms such as "central", "longitudinal", "lateral", "front", "rear", "right", "left", "inner", "outer", "lower", "upper", "horizontal", "vertical", "above", "below", "up", "top", "bottom" as well as derivative thereof (e.g., "horizontally", "downwardly", "upwardly", etc.) should be construed to refer to the orientation as then described or as shown in the drawings under discussion. These relative terms are for convenience of description and do not require that the present invention be constructed or operated in a particular orientation. In addition, terms such as "first" and "second" are used herein for purposes of description and are not intended to indicate or imply relative importance.

In the description of the present invention, it should be understood that, unless specified or limited otherwise, the terms "mounted," "connected," and "coupled" and variations thereof are used broadly and encompass such as fixed, detachable, or integrated mountings, connections and couplings; mechanical or electrical mountings, connections and couplings; further can be direct mountings, connections, and couplings or indirect mountings, connections, and couplings by using an intermediate medium; or also can be inner mountings, connections and couplings of two components. Specific meanings of the foregoing terms in the present invention can be understood by those skilled in the art according to the specific cases.

The following describes a start control system of a vehicle and a vehicle having the system according to the embodiments of the present invention with reference to the accompanying drawings.

Figure 3:
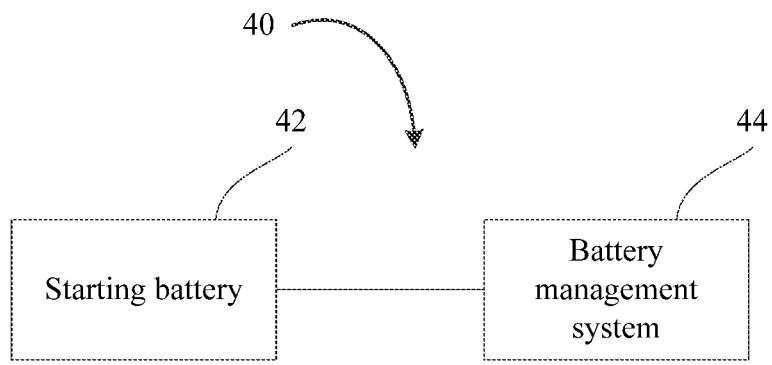
FIG. 3 is a structural block diagram of a starting power supply according to an embodiment of the present invention.

FIG. 1 is a schematic structural diagram of a start control system of a vehicle according to an embodiment of the present invention. As shown in FIG. 1, a start control system of a vehicle 100 according to an embodiment of the present invention includes: an ECU 10, a starter 20, an air conditioner 30, and a starting power supply 40. As shown in FIG. 3, the starting power supply 40 specifically includes a starting battery 42 and a BMS 44. The BMS 44 may be disposed inside or outside the starting power supply 40.

Figure 2:
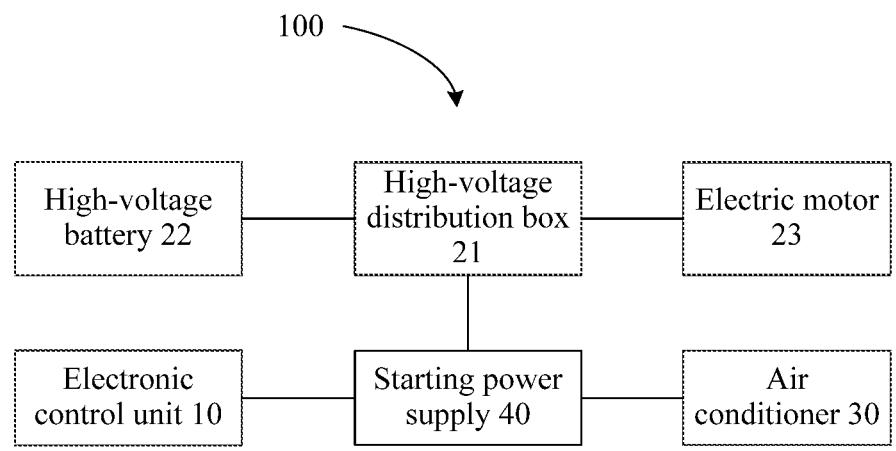
FIG. 2 is a schematic structural diagram of a start control system of a vehicle according to another embodiment of the present invention.

FIG. 2 is a schematic structural diagram of a start control system of a vehicle according to another embodiment of the present invention. As shown in FIG. 2, a start control system of a vehicle 100 according to an embodiment of the present invention includes: an ECU 10, an air conditioner 30, a high-voltage battery 22, a high-voltage distribution box 21, an electric motor 23, and a starting power supply 40. As shown in FIG. 3, the starting power supply 40 specifically includes a starting battery 42 and a BMS 44. The BMS 44 may be disposed inside or outside the starting power supply 40. The ECU 10 is configured to send an ignition request signal or a starting signal. The BMS 44 is configured to receive the ignition request signal or starting signal sent by the ECU 10, and detect the temperature of the starting battery 42; and is configured to connect the air conditioner 30 to the starting battery 42 when the temperature of the starting battery 42 is less than a preset threshold, so that after the starting battery 42 keeps discharging at a high current for a preset time, the starting battery reaches a normal operating temperature. In this case, the starting battery may provide a starting current to the starter 20 to start the starter 20, or control the high-voltage distribution box 21 to be connected to the high-voltage battery 22 and the electric motor 23.

In an embodiment of the present invention, a range of the high current is from 50 A to 450 A.

In an embodiment of the present invention, a range of the preset time is from 5 s to 30 s.

In an actual process, a control process for starting a vehicle of an ordinary fuel vehicle type or a DM vehicle type in a fuel mode is as follows: In a low-temperature environment, when an ignition switch is ON, the BMS 44 detects the temperature of the starting battery 42 after receiving the ignition request signal sent by the ECU 10. When the temperature is less than the preset threshold, the starting battery 42 is connected to the air conditioner 30 for a preset time, so that the starting battery 42 raises the temperature of the starting battery 42 by means of discharging at a high current continuously and temporarily, so as to improve an ignition capability of the vehicle to start the starter 20.

A control process for starting a vehicle of an all-electric vehicle type or a DM vehicle type in an all-electric mode is as follows: In a low-temperature environment, when a starting switch is ON, the BMS 44 detects the temperature of the starting battery 42 after receiving the starting signal sent by the ECU 10. When the temperature is less than the preset threshold, the starting battery 42 is connected to the air conditioner 30 for a preset time, so that the starting battery 42 raises the temperature of the starting battery 42 by means of discharging at a high current continuously and temporarily, and then the high-voltage distribution box 21 is controlled to be connected to the high-voltage battery 22 and the electric motor 23, so as to start the vehicle.

In an embodiment of the present invention, when the temperature is less than −25° C., the starting battery 42 may be connected to a positive temperature coefficient (PTC) thermistor of the air conditioner 30 for 10 seconds, so that the starting battery 42 raises the temperature of the starting battery 42 by means of discharging at a high current continuously and temporarily. Specifically, in an embodiment of the present invention, the start control system 100 further includes a CAN bus 51, where the ECU 10 is connected to the BMS 44 by using the CAN bus 51. The CAN bus 51 is configured to implement information exchange between the ECU 10 and the BMS 44.

In an embodiment of the present invention, the starting battery 42 is a lithium-ion battery. The BMS 44 samples a single set of temperatures inside the lithium-ion battery in real time, and also needs to sample an overall temperature of the lithium-ion battery. Data of the single set of temperatures and data of the overall temperature are both sent to a vehicle network by using the CAN bus 51. When the ignition switch is ON, in an embodiment of the present invention, when it is detected that the temperature of the lithium-ion battery is less than −25° C., the lithium-ion battery is connected to the air conditioner 30 for 10 seconds, so that the lithium-ion battery raises the temperature of the lithium-ion battery by means of discharging at a high current temporarily, and an ignition process or a starting process is then performed. When the vehicle is started, the lithium-ion battery supplies power to a starting system separately. In addition, the BMS 44 further samples a single set of voltages and an overall voltage of the lithium-ion battery. When it is detected that a voltage of any starting battery pack is excessively high or low, the BMS 44 may control the starting battery pack to be discharged or charged, so that the voltage of the starting battery pack is identical with those of other starting battery packs, thereby reaching a balance. Data of the single set of voltages and data of the overall voltage are both sent to the vehicle network by using the CAN bus 51. In this way, a conventional lead-acid battery is replaced with a lithium-ion battery, so as to implement a lead-free vehicle, and achieve more desirable cycle performance and service life.

In an embodiment of the present invention, the start control system 100 further includes a control switch. The BMS 44 controls the control switch to be closed or opened to control the starting battery 42 and the air conditioner 30 to be connected or disconnected. For example, in an embodiment of the present invention, the control switch is a relay. When it is detected that the temperature of the starting battery 42 is less than the preset threshold, for example, −25° C., the BMS 44 sends a signal to the relay to control the relay to be closed, so that the starting battery 42 is connected to the air conditioner 30 for a preset time, for example, 10 seconds. Therefore, the starting battery 42 raises the temperature of the starting battery 42 by means of discharging at a high current continuously and temporarily, and the ignition process or the starting process is then performed to start the starter 20, or the high-voltage distribution box 21 is controlled to be connected to the high-voltage battery 22 and the electric motor 23.

In an embodiment of the present invention, the start control system 100 further includes a DC-DC converter 70. The DC-DC converter 70 is configured to convert a low-voltage output of the starting battery 42 into a high-voltage output. The DC-DC converter 70 includes a high voltage side and a low voltage side. In an embodiment of the present invention, the starting battery 42 is connected to the low voltage side of the DC-DC converter 70, and the air conditioner 30 is connected to the low voltage side of the DC-DC converter 70. When the BMS 44 detects that the temperature of the starting battery 42 is less than the preset threshold, for example, −25° C., the air conditioner 30 may be directly connected to the starting battery 42. In another embodiment of the present invention, the starting battery 42 is connected to the low voltage side of the DC-DC converter 70, and the air conditioner 30 is connected to the high voltage side of the DC-DC converter 70. When the BMS 44 detects that the temperature of the starting battery 42 is less than the preset threshold, for example, −25° C., the air conditioner 30 is connected to the starting battery 42 by using the DC-DC converter 70 for a preset time, for example, 10 seconds. Therefore, the starting battery 42 raises the temperature of the starting battery 42 by means of discharging at a high current continuously and temporarily, and the ignition process or the starting process is then performed to start the starter 20, or the high-voltage distribution box 21 is controlled to be connected to the high-voltage battery 22 and the electric motor 23.

In an embodiment of the present invention, the start control system 100 further includes a compressor 80. The compressor 80 is located on the high voltage side of the DC-DC converter 70, and is connected to the starting battery 42 by using the DC-DC converter 70, so as to perform heating by using the compressor 80 to increase a discharging current of the starting battery 42, thereby preheating and heating up the starting battery 42. In addition, heat of the air conditioner 30 can also heat the starting battery 42 to some extent.

In an embodiment of the present invention, the start control system 100 further includes a LIN bus 52, an ECM 90, and a generator 11. The ECM 90 is connected to the generator 11 by using the LIN bus 52.

Figure 4:
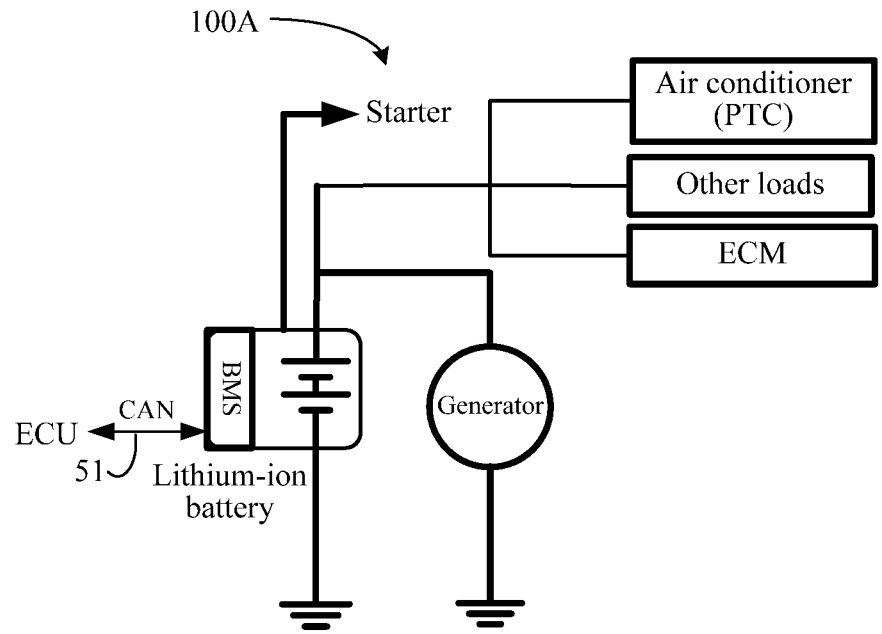
FIG. 4 is a schematic structural diagram of a start control system of an ordinary fuel vehicle according to an embodiment of the present invention.

As a specific example, in a start control system 100A of an ordinary fuel vehicle type shown in FIG. 4, a start control process is as follows: When the ECU 10 sends an ignition request signal to the BMS 44 by using the CAN bus 51, the BMS 44 receives the signal and detects the temperature of the starting battery 42 (lithium-ion battery) in real time. When the temperature is less than the preset threshold, for example, −25° C., the lithium-ion battery is connected to the PTC of the air conditioner 30, so that the starting battery 42 raises the temperature of the starting battery 42 by means of discharging at a high current continuously and temporarily for a preset time, so as to improve the ignition capability of the vehicle.

Figure 5:
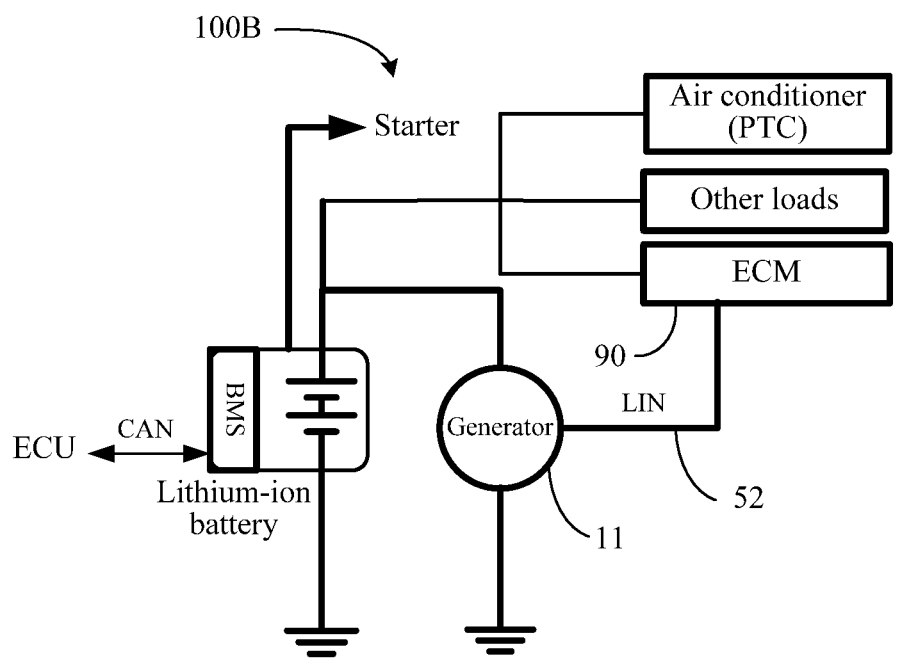
FIG. 5 is a schematic structural diagram of a start control system of an ordinary fuel vehicle having a LIN bus according to an embodiment of the present invention.

The start control system according to the embodiments of the present invention is also applicable to an ordinary fuel vehicle type having a LIN bus 52. In a start control system 100B shown in FIG. 5, the LIN bus 52 connects the ECM 90 to the generator 11. After an engine is started, the ECM 90 sends a signal to the generator 11 by using the LIN bus 52 to generate electricity, so as to charge the lithium-ion battery while supplying power to other loads on the vehicle.

In an embodiment of the present invention, the start control system 100 further includes a master control unit located in the high-voltage distribution box 21. The starting battery 42 is configured to control the master control unit to be closed or opened to control the high-voltage battery 22 and the electric motor 23 to be connected or disconnected.

Figure 6:
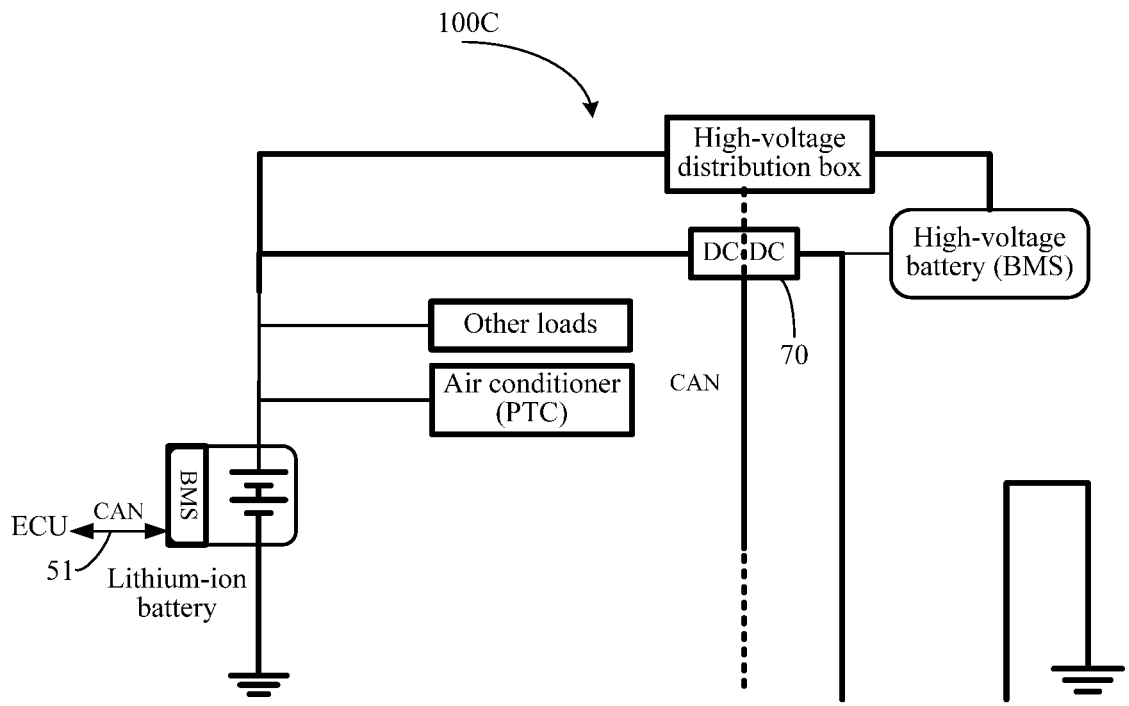
FIG. 6 is a schematic structural diagram of a start control system of an all-electric vehicle according to an embodiment of the present invention.

As another specific example, in a start control system 100C of an all-electric vehicle type shown in FIG. 6, a start control process is as follows: When the ECU 10 sends a starting signal to the BMS 44 by using the CAN bus 51, the BMS 44 receives the signal and detects the temperature of the starting battery 42 (lithium-ion battery) in real time. When the temperature is less than the preset threshold, for example, −25° C., the lithium-ion battery is connected to the PTC of the air conditioner 30, so that the lithium-ion battery raises the temperature of the lithium-ion battery by means of discharging at a high current continuously and temporarily, so as to improve a starting capability of the vehicle. After the starting battery 42 reaches the normal operating temperature, the starting battery 42 controls the master control unit in the high-voltage distribution box 21 to be closed, so as to connect the high-voltage battery 22 to the electric motor 23 by using the high-voltage distribution box. Therefore, the vehicle can be started. After the vehicle is started, the high-voltage battery 22 is powered on by using the high-voltage distribution box 21. Subsequently, the high-voltage battery 22 converts a high-voltage current of the high-voltage battery 22 into a low-voltage current by using the DC-DC converter 70, so as to charge the starting battery (lithium-ion battery).

Figure 7:
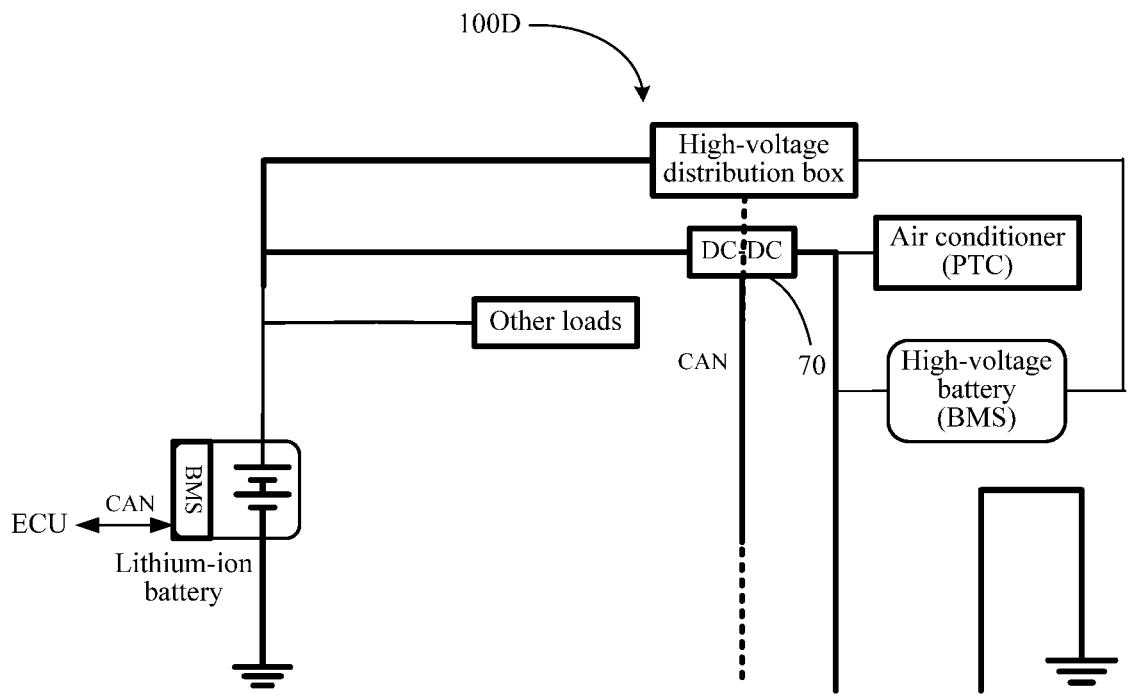
FIG. 7 is a schematic structural diagram of a start control system of an all-electric vehicle according to another embodiment of the present invention.

The start control system according to an embodiment of the present invention is also applicable to the all-electric vehicle type shown in FIG. 7. In a start control system 100D, when the air conditioner 30 is located on the high voltage side of the DC-DC converter 70, the lithium-ion battery is connected to the PTC of the air conditioner 30 by using the DC-DC converter 70 for a preset time, for example, 10 seconds, so that the lithium-ion battery raises the temperature of the lithium-ion battery by means of discharging at a high current temporarily. Similarly, after the starting battery 42 reaches the normal operating temperature, the starting battery 42 controls the master control unit in the high-voltage distribution box 21 to be closed, so as to connect the high-voltage battery 22 to the electric motor 23 by using the high-voltage distribution box. Therefore, the vehicle can be started. After the vehicle is started, the high-voltage battery 22 is powered on by using the high-voltage distribution box 21. Subsequently, the high-voltage battery 22 converts a high-voltage current of the high-voltage battery 22 into a low-voltage current by using the DC-DC converter 70, so as to charge the starting battery (lithium-ion battery).

Figure 8:
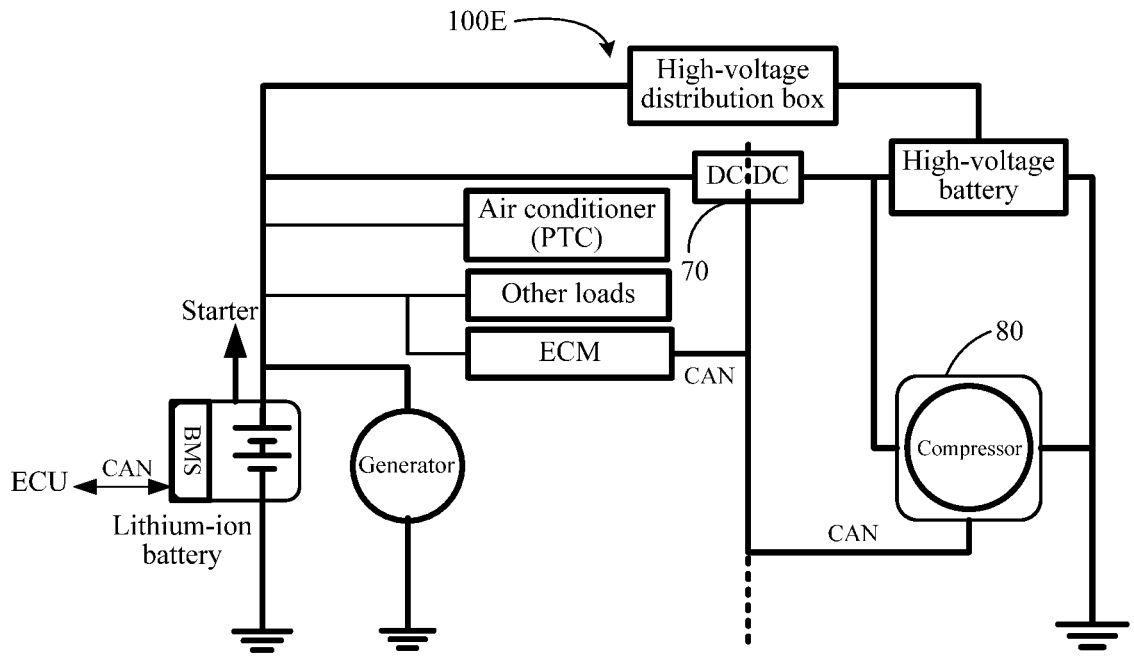
FIG. 8 is a schematic structural diagram of a start control system of a dual-mode (DM) vehicle according to an embodiment of the present invention.

As another specific embodiment, in a DM vehicle type, in a start control system 100E shown in FIG. 8, when the air conditioner 30 is connected to the low voltage side of the DC-DC converter 70, the start control process of the embodiment of the present invention is as follows: When the ECU 10 sends an ignition request signal to the BMS 44 by using the CAN bus 51, the BMS 44 receives the signal and detects the temperature of the starting battery 42 (lithium-ion battery) in real time. When the temperature is less than the preset threshold, for example, −25° C., the lithium-ion battery is directly connected to the PTC of the air conditioner 30 for a preset time, for example, 10 seconds. In addition, the lithium-ion battery connected to the low voltage side of the DC-DC converter 70 may be connected, by using the CAN bus 51, to the compressor 80 located on the high voltage side of the DC-DC converter 70. Load consumption of the lithium-ion battery is further increased in a heating process of the compressor 80, so that the lithium-ion battery effectively raises the temperature of the lithium-ion battery by means of discharging at a high current continuously and temporarily. Heat dissipated by the air conditioner 30 can also heat the starting battery 42 to some extent, and at the same time raise the temperature of an environment inside the vehicle.

Figure 9:
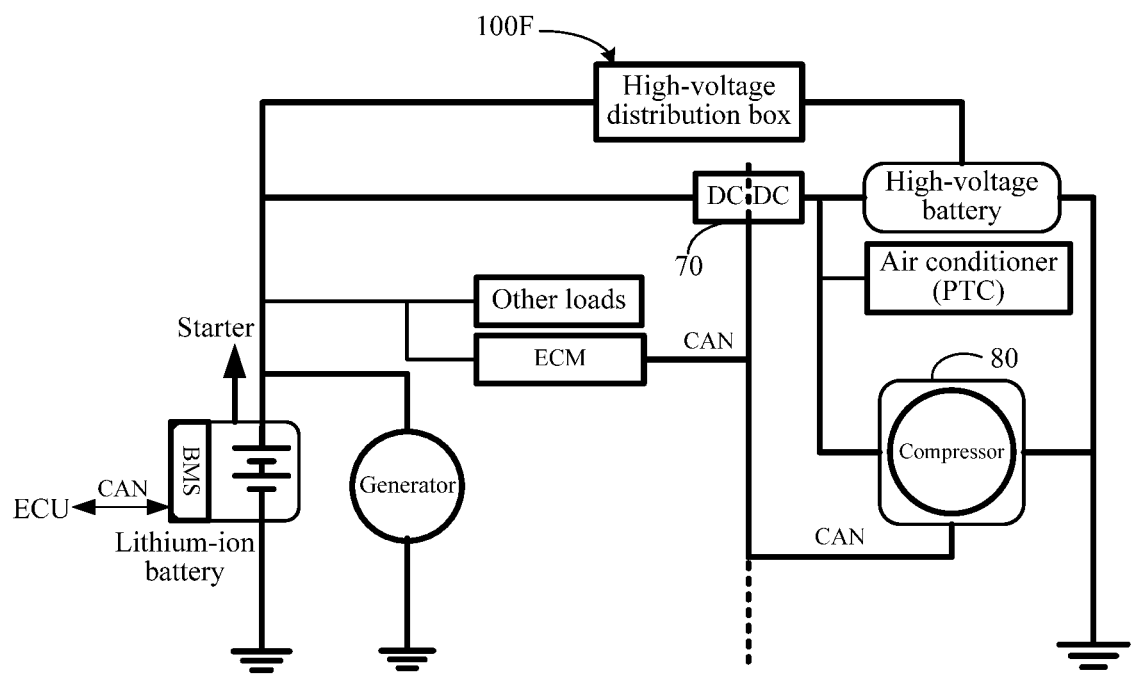
FIG. 9 is a schematic structural diagram of a start control system of a DM vehicle according to another embodiment of the present invention.

In a start control system 100F shown in FIG. 9, when the air conditioner 30 is connected to the high voltage side of the DC-DC converter 70, the air conditioner 30 is connected to the lithium-ion battery by using the DC-DC converter 70 after being connected in parallel with the compressor 80. When the temperature is less than −25° C., the starting battery 42 may be connected to the PTC of the air conditioner 30 and the compressor 80 for 10 seconds, so that the starting battery 42 raises the temperature of the starting battery 42 by means of discharging at a high current continuously and temporarily, so as to improve the ignition capability of the vehicle.

Figure 10:
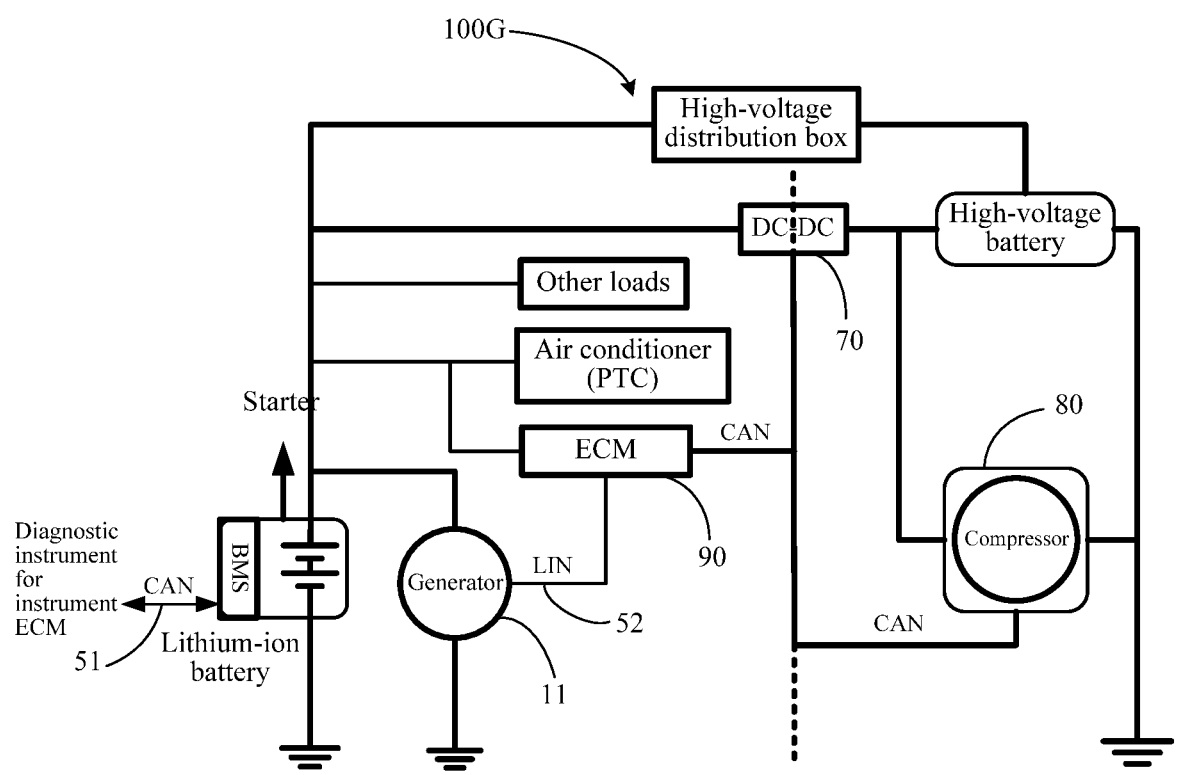
FIG. 10 is a schematic structural diagram of a start control system of a DM vehicle having a LIN bus according to an embodiment of the present invention.

In addition, the start control system according to the embodiments of the present invention is also applicable to the DM vehicle type having a LIN bus 52. In a start control system 100G shown in FIG. 10, when the air conditioner is connected to the low voltage side of the DC-DC converter 70, the start control process of the embodiment of the present invention is as follows: When the ECU 10 sends an ignition request signal to the BMS 44 by using the CAN bus 51, the BMS 44 receives the signal and detects the temperature of the starting battery 42 (lithium-ion battery) in real time. When the temperature is less than the preset threshold, for example, −25° C., the lithium-ion battery is directly connected to the PTC of the air conditioner 30 for a preset time, for example, 10 seconds. In addition, the lithium-ion battery connected to the low voltage side of the DC-DC converter 70 may be connected, by using the CAN bus 51, to the compressor 80 located on the high voltage side of the DC-DC converter 70. The load consumption of the lithium-ion battery is further increased in the heating process of the compressor 80, so that the lithium-ion battery raises the temperature of the lithium-ion battery by means of discharging at a high current continuously and temporarily, so as to improve the ignition capability of the vehicle.

Figure 11:
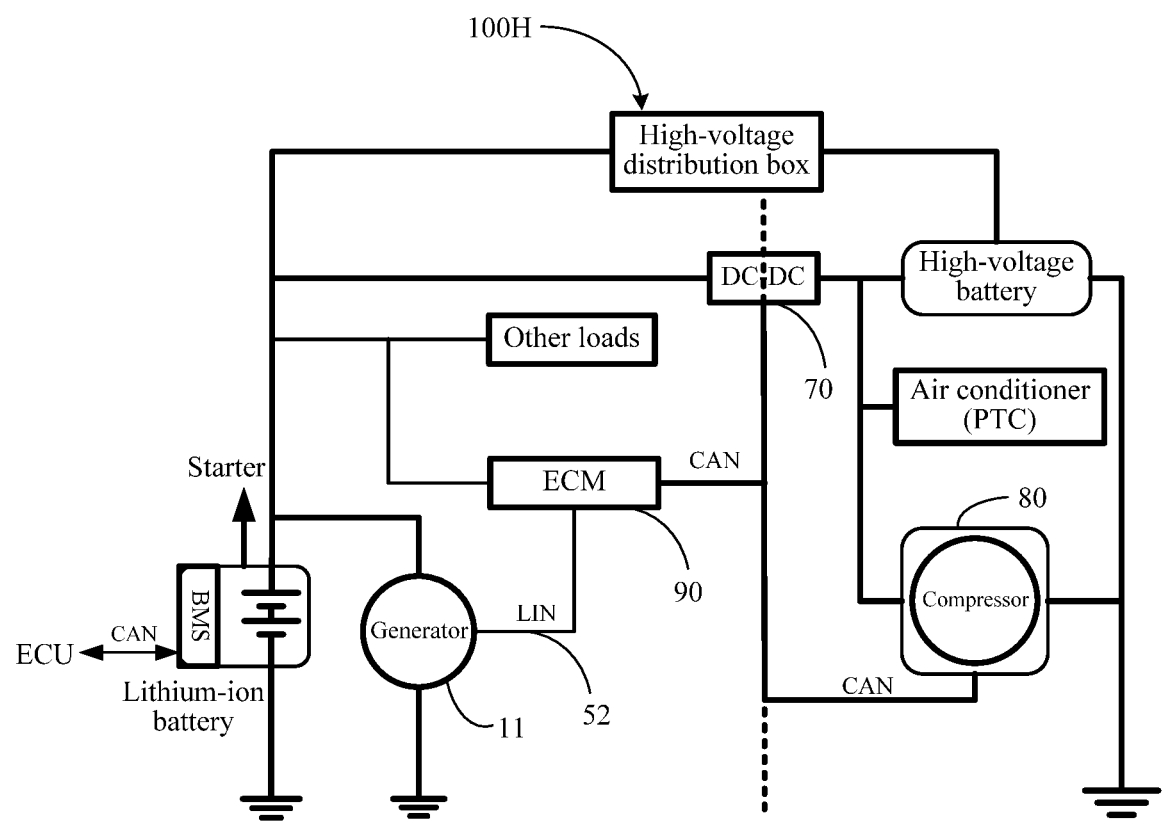
FIG. 11 is a schematic structural diagram of a start control system of a DM vehicle having a LIN bus according to another embodiment of the present invention.

In a start control system 100H shown in FIG. 11, when the air conditioner 30 is connected to the high voltage side of the DC-DC converter 70, the air conditioner 30 is connected to the lithium-ion battery by using the DC-DC converter 70 after being connected in parallel with the compressor 80. When the temperature is less than −25° C., the starting battery 42 may be connected to the PTC of the air conditioner 30 and the compressor 80 for 10 seconds, so that the starting battery 42 raises the temperature of the starting battery 42 by means of discharging at a high current continuously and temporarily, so as to improve the ignition capability of the vehicle. In the two cases of FIG. 10 and FIG. 11, the LIN bus 52 connects the ECM 90 to the generator 11. After the engine is started, the ECM 90 sends a signal to the generator 11 by using the LIN bus 52 to generate electricity, so as to charge the lithium-ion battery while supplying power to other loads on the vehicle.

According to the start control system of a vehicle of the embodiment of the present invention, in a low-temperature environment, when receiving an ignition request signal or a starting signal sent by an ECU, a BMS detects the temperature of a starting battery. When the temperature is less than a preset threshold, the starting battery is connected to an air conditioner for a preset time, so that the starting battery raises the temperature of the starting battery by means of discharging at a high current temporarily. Therefore, a starting capability of a vehicle is improved, and the temperature of an environment inside the vehicle is also raised. The start control system extends a temperature range and an area of using a vehicle and improves competitiveness of the vehicle.

An embodiment of a second aspect of the present invention provides a vehicle, and the vehicle includes the foregoing start control system of a vehicle. The start control system of a vehicle according to the embodiments of the present invention is described below in detail with reference to FIG. 1 to FIG. 11. Specifically, a start control system of a vehicle 100 according to an embodiment of the present invention includes: an ECU 10, a starter 20, an air conditioner 30, and a starting power supply 40, as shown in FIG. 1. Alternatively, the start control system of a vehicle 100 according to an embodiment of the present invention includes: an ECU 10, an air conditioner 30, a high-voltage battery 22, a high-voltage distribution box 21, an electric motor 23, and a starting power supply 40, as shown in FIG. 2. As shown in FIG. 3, the starting power supply 40 specifically includes a starting battery 42 and a BMS 44. The BMS 44 may be disposed inside or outside the starting power supply 40.

The ECU 10 is configured to send an ignition request signal or a starting signal. The BMS 44 is configured to receive the ignition request signal or starting signal sent by the ECU 10, and detect the temperature of the starting battery 42; and is configured to connect the air conditioner 30 to the starting battery 42 when the temperature of the starting battery 42 is less than a preset threshold, so that after the starting battery 42 keeps discharging at a high current for a preset time, the starting battery reaches a normal operating temperature. In this case, the starting battery may provide a starting current to the starter 20 to start the starter 20, or control the high-voltage distribution box 21 to be connected to the high-voltage battery 22 and the electric motor 23.

In an embodiment of the present invention, a range of the high current is from 50 A to 450 A.

In an embodiment of the present invention, a range of the preset time is from 5 s to 30 s.

In an actual process, a control process for starting a vehicle of an ordinary fuel vehicle type or a DM vehicle type in a fuel mode is as follows: In a low-temperature environment, when an ignition switch is ON, the BMS 44 detects the temperature of the starting battery 42 after receiving the ignition request signal sent by the ECU 10. When the temperature is less than the preset threshold, the starting battery 42 is connected to the air conditioner 30 for a preset time, so that the starting battery 42 raises the temperature of the starting battery 42 by means of discharging at a high current continuously and temporarily, so as to improve an ignition capability of the vehicle to start the starter 20. Similarly, a control process for starting a vehicle of an all-electric vehicle type or a DM vehicle type in an all-electric mode is as follows: In a low-temperature environment, when a starting switch is ON, the BMS 44 detects the temperature of the starting battery 42 after receiving the starting signal sent by the ECU 10. When the temperature is less than the preset threshold, the starting battery 42 is connected to the air conditioner 30 for a preset time, so that the starting battery 42 raises the temperature of the starting battery 42 by means of discharging at a high current continuously and temporarily, and then the high-voltage distribution box 21 is controlled to be connected to the high-voltage battery 22 and the electric motor 23, so as to start the vehicle.

In an embodiment of the present invention, when the temperature is less than −25° C., the starting battery 42 may be connected to a PTC thermistor of the air conditioner 30 for 10 seconds, so that the starting battery 42 raises the temperature of the starting battery 42 by means of discharging at a high current continuously and temporarily. Specifically, in an embodiment of the present invention, the start control system 100 further includes a CAN bus 51, where the ECU 10 is connected to the BMS 44 by using the CAN bus 51. The CAN bus 51 is configured to implement information exchange between the ECU 10 and the BMS 44.

In an embodiment of the present invention, the starting battery 42 is a lithium-ion battery. The BMS 44 samples a single set of temperatures inside the lithium-ion battery in real time, and also needs to sample an overall temperature of the lithium-ion battery. Data of the single set of temperatures and data of the overall temperature are both sent to a vehicle network by using the CAN bus 51. When the ignition switch is ON, in an embodiment of the present invention, when it is detected that the temperature of the lithium-ion battery is less than −25° C., the lithium-ion battery is connected to the air conditioner 30 for 10 seconds, so that the lithium-ion battery raises the temperature of the lithium-ion battery by means of discharging at a high current temporarily, and an ignition process is then performed. When the vehicle is started, the lithium-ion battery supplies power to a starting system separately. In addition, the BMS 44 further samples a single set of voltages and an overall voltage of the lithium-ion battery. When it is detected that a voltage of any starting battery pack is excessively high or low, the BMS 44 may control the starting battery pack to be discharged or charged, so that the voltage of the starting battery pack is identical with those of other starting battery packs, thereby reaching a balance. Data of the single set of voltages and data of the overall voltage are both sent to the vehicle network by using the CAN bus 51. In this way, a conventional lead-acid battery is replaced with a lithium-ion battery, so as to implement a lead-free vehicle, and achieve more desirable cycle performance and service life.

In an embodiment of the present invention, the start control system 100 further includes a control switch. The BMS 44 controls the control switch to be closed or opened to control the starting battery 42 and the air conditioner 30 to be connected or disconnected. For example, in an embodiment of the present invention, the control switch is a relay. When it is detected that the temperature of the starting battery 42 is less than the preset threshold, for example, −25° C., the BMS 44 sends a signal to the relay to control the relay to be closed, so that the starting battery 42 is connected to the air conditioner 30 for a preset time, for example, 10 seconds. Therefore, the starting battery 42 raises the temperature of the starting battery 42 by means of discharging at a high current continuously and temporarily, and the ignition process is then performed to start the starter 20, or the high-voltage distribution box 21 is controlled to be connected to the high-voltage battery 22 and the electric motor 23.

In an embodiment of the present invention, the start control system 100 further includes a DC-DC converter 70. The DC-DC converter 70 is configured to convert a low-voltage output of the starting battery 42 into a high-voltage output. The DC-DC converter 70 includes a high voltage side and a low voltage side. In an embodiment of the present invention, the starting battery 42 is connected to the low voltage side of the DC-DC converter 70, and the air conditioner 30 is connected to the low voltage side of the DC-DC converter 70. When the BMS 44 detects that the temperature of the starting battery 42 is less than the preset threshold, for example, −25° C., the air conditioner 30 may be directly connected to the starting battery 42. In another embodiment of the present invention, the starting battery 42 is connected to the low voltage side of the DC-DC converter 70, and the air conditioner 30 is connected to the high voltage side of the DC-DC converter 70. When the BMS 44 detects that the temperature of the starting battery 42 is less than the preset threshold, for example, −25° C., the air conditioner 30 is connected to the starting battery 42 by using the DC-DC converter 70 for a preset time, for example, 10 seconds. Therefore, the starting battery 42 raises the temperature of the starting battery 42 by means of discharging at a high current continuously and temporarily, and the ignition process is then performed to start the starter 20, or the high-voltage distribution box 21 is controlled to be connected to the high-voltage battery 22 and the electric motor 23.

In an embodiment of the present invention, the start control system 100 further includes a compressor 80. The compressor 80 is located on the high voltage side of the DC-DC converter 70, and is connected to the starting battery 42 by using the DC-DC converter 70, so as to perform heating by using the compressor 80 to increase a discharging current of the starting battery 42, thereby preheating and heating up the starting battery 42. In addition, heat of the air conditioner 30 can also heat the starting battery 42 to some extent.

In an embodiment of the present invention, the start control system 100 further includes a LIN bus 52, an ECM 90, and a generator 11. The ECM 90 is connected to the generator 11 by using the LIN bus 52.

As a specific example, in a start control system 100A of an ordinary fuel vehicle type shown in FIG. 4, a start control process is as follows: When the ECU 10 sends an ignition request signal to the BMS 44 by using the CAN bus 51, the BMS 44 receives the signal and detects the temperature of the starting battery 42 (lithium-ion battery) in real time. When the temperature is less than the preset threshold, for example, −25° C., the lithium-ion battery is connected to the PTC of the air conditioner 30, so that the starting battery 42 raises the temperature of the starting battery 42 by means of discharging at a high current continuously and temporarily for a preset time, so as to improve the ignition capability of the vehicle.

The start control system according to the embodiments of the present invention is also applicable to an ordinary fuel vehicle type having a LIN bus 52. In a start control system 100B shown in FIG. 5, the LIN bus 52 connects the ECM 90 to the generator 11. After an engine is started, the ECM 90 sends a signal to the generator 11 by using the LIN bus 52 to generate electricity, so as to charge the starting battery (lithium-ion battery) while supplying power to other loads on the vehicle.

In an embodiment of the present invention, the start control system 100 further includes a master control unit located in the high-voltage distribution box 21. The starting battery 42 is configured to control the master control unit to be closed or opened to control the high-voltage battery 22 and the electric motor 23 to be connected or disconnected.

As another specific example, in a start control system 100C of an all-electric vehicle type shown in FIG. 6, a start control process is as follows: When the ECU 10 sends an ignition request signal to the BMS 44 by using the CAN bus 51, the BMS 44 receives the signal and detects the temperature of the starting battery 42 (lithium-ion battery) in real time. When the temperature is less than the preset threshold, for example, −25° C., the lithium-ion battery is directly connected to the PTC of the air conditioner 30, so that the lithium-ion battery raises the temperature of the lithium-ion battery by means of discharging at a high current continuously and temporarily, so as to improve a starting capability of the vehicle. After the starting battery 42 reaches the normal operating temperature, the starting battery 42 controls the master control unit in the high-voltage distribution box 21 to be closed, so as to connect the high-voltage battery 22 to the electric motor 23 by using the high-voltage distribution box. Therefore, the vehicle can be started. After the vehicle is started, the high-voltage battery 22 is powered on by using the high-voltage distribution box 21. Subsequently, the high-voltage battery 22 converts a high-voltage current of the high-voltage battery 22 into a low-voltage current by using the DC-DC converter 70, so as to charge the starting battery (lithium-ion battery).

The start control system according to an embodiment of the present invention is also applicable to the all-electric vehicle type shown in FIG. 7. In a start control system 100D, when the air conditioner 30 is located on the high voltage side of the DC-DC converter 70, the lithium-ion battery is connected to the PTC of the air conditioner 30 by using the DC-DC converter 70 for a preset time, for example, 10 seconds, so that the lithium-ion battery raises the temperature of the lithium-ion battery by means of discharging at a high current temporarily. Similarly, after the starting battery 42 reaches the normal operating temperature, the starting battery 42 controls the master control unit in the high-voltage distribution box 21 to be closed, so as to connect the high-voltage battery 22 to the electric motor 23 by using the high-voltage distribution box. Therefore, the vehicle can be started. After the vehicle is started, the high-voltage battery 22 is powered on by using the high-voltage distribution box 21. Subsequently, the high-voltage battery 22 converts a high-voltage current of the high-voltage battery 22 into a low-voltage current by using the DC-DC converter 70, so as to charge the starting battery (lithium-ion battery).

As another specific embodiment, in a DM vehicle type, in a start control system 100E shown in FIG. 8, when the air conditioner 30 is connected to the low voltage side of the DC-DC converter 70, the ignition control process of the embodiment of the present invention is as follows: When the ECU 10 sends an ignition request signal to the BMS 44 by using the CAN bus 51, the BMS 44 receives the signal and detects the temperature of the starting battery 42 (lithium-ion battery) in real time. When the temperature is less than the preset threshold, for example, −25° C., the lithium-ion battery is directly connected to the PTC of the air conditioner 30 for a preset time, for example, 10 seconds. In addition, the lithium-ion battery connected to the low voltage side of the DC-DC converter 70 may be connected, by using the CAN bus 51, to the compressor 80 located on the high voltage side of the DC-DC converter 70. Load consumption of the lithium-ion battery is further increased in a heating process of the compressor 80, so that the lithium-ion battery effectively raises the temperature of the lithium-ion battery by means of discharging at a high current continuously and temporarily. Heat dissipated by the air conditioner 30 can also heat the starting battery 42 to some extent, and at the same time raise the temperature of an environment inside the vehicle.

In a start control system 100F shown in FIG. 9, when the air conditioner 30 is connected to the high voltage side of the DC-DC converter 70, the air conditioner 30 is connected to the lithium-ion battery by using the DC-DC converter 70 after being connected in parallel with the compressor 80. When the temperature is less than −25° C., the starting battery 42 may be connected to the PTC of the air conditioner 30 and the compressor 80 for 10 seconds, so that the starting battery 42 raises the temperature of the starting battery 42 by means of discharging at a high current continuously and temporarily, so as to improve the ignition capability of the vehicle.

In addition, the start control system according to the embodiments of the present invention is also applicable to the DM vehicle type having a LIN bus 52. In a start control system 100G shown in FIG. 10, when the air conditioner is connected to the low voltage side of the DC-DC converter 70, the start control process of the embodiment of the present invention is as follows: When the ECU 10 sends an ignition request signal to the BMS 44 by using the CAN bus 51, the BMS 44 receives the signal and detects the temperature of the starting battery 42 (lithium-ion battery) in real time. When the temperature is less than the preset threshold, for example, −25° C., the lithium-ion battery is directly connected to the PTC of the air conditioner 30 for a preset time, for example, 10 seconds. In addition, the lithium-ion battery connected to the low voltage side of the DC-DC converter 70 may be connected, by using the CAN bus 51, to the compressor 80 located on the high voltage side of the DC-DC converter 70. The load consumption of the lithium-ion battery is further increased in the heating process of the compressor 80, so that the lithium-ion battery raises the temperature of the lithium-ion battery by means of discharging at a high current continuously and temporarily, so as to improve the ignition capability of the vehicle.

In a start control system 100H shown in FIG. 11, when the air conditioner 30 is connected to the high voltage side of the DC-DC converter 70, the air conditioner 30 is connected to the lithium-ion battery by using the DC-DC converter 70 after being connected in parallel with the compressor 80. When the temperature is less than −25° C., the starting battery 42 may be connected to the PTC of the air conditioner 30 and the compressor 80 for 10 seconds, so that the starting battery 42 raises the temperature of the starting battery 42 by means of discharging at a high current continuously and temporarily, so as to improve the ignition capability of the vehicle. In the two cases of FIG. 10 and FIG. 11, the LIN bus 52 connects the ECM 90 to the generator 11. After the engine is started, the ECM 90 sends a signal to the generator 11 by using the LIN bus 52 to generate electricity, so as to charge the lithium-ion battery while supplying power to other loads on the vehicle.

In addition, other components and functions of the vehicle according to the embodiments of the present invention are known by a person skilled in the art, and the details are not described herein again.

According to the vehicle of the embodiment of the present invention, in a low-temperature environment, by means of a start control system of the vehicle, when receiving an ignition request signal or a starting signal sent by an ECU, a BMS detects the temperature of a starting battery. When the temperature is less than a preset threshold, the starting battery is connected to an air conditioner for a preset time, so that the starting battery effectively raises the temperature of the starting battery by means of discharging at a high current temporarily. Therefore, a starting capability of a vehicle is improved, and the temperature of an environment inside the vehicle is also raised. The vehicle has an extended temperature range and an extended area for use, and also has higher competitiveness.

Reference throughout this specification to "an embodiment," "some embodiments," "an example," "a specific example," or "some examples," means that a particular feature, structure, material, or characteristic described in connection with the embodiment or example is included in at least one embodiment or example of the present invention. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present invention.

Furthermore, the particular features, structures, materials, or characteristics may be combined in any suitable manner in one or more embodiments or examples.

Although explanatory embodiments have been shown and described, it would be appreciated by those skilled in the art that the above embodiments cannot be construed to limit the present invention, and changes, alternatives, and modifications can be made in the embodiments without departing from spirit, principles and scope of the present invention.

What is claimed is:

1. A start control system for a vehicle, comprising:
an electronic control unit (ECU), configured to send an ignition request signal;
a starter;
an engine control module (ECM);
an air conditioner having a positive temperature coefficient (PTC) thermistor; and
a starting power supply, wherein the starting power supply comprises:
a starting battery connected to the PTC thermistor of the air conditioner and the ECM; and
a battery management system (BMS), wherein
the ECU is connected to the BMS, and
the BMS is configured to, before the starter is started, receive the ignition request signal sent by the ECU, and detect a temperature of the starting battery,
in response to detecting that the temperature of the starting battery is less than a preset threshold, directly connect the PTC thermistor of the air conditioner to the starting battery to cause the starting battery to discharge at a high current for a preset time and to provide a starting current to the starter after the discharging for the preset time to start the starter, and
after the discharging for the preset time, disconnect the PTC thermistor of the air conditioner from the starting battery.

2. The system according to claim 1, wherein the starting battery is a lithium-ion battery.

3. The system according to claim 1, wherein the high current is in a range from 50 A to 450 A.

4. The system according to claim 1, wherein the preset time is in a range from 5 s to 30 s.

5. The system according to claim 1, further comprising: a controller area network (CAN) bus, wherein the ECU is connected to the BMS by the CAN bus.

6. The system according to claim 1, further comprising: a control switch, wherein the BMS controls the control switch to be closed or opened to control the starting battery and the PTC thermistor of the air conditioner to be connected or disconnected.

7. The system according to claim 1, further comprising: a DC-DC converter, wherein the DC-DC converter comprises a high voltage side and a low voltage side, the starting battery is connected to the low voltage side, the PTC thermistor of the air conditioner is connected to the high voltage side, and the DC-DC converter is configured to convert a low-voltage output of the starting battery into a high-voltage output.

8. The system according to claim 1, further comprising: a compressor, wherein the compressor is connected to the high voltage side of the DC-DC converter, so as to increase load consumption of the starting battery.

9. The system according to claim 1, further comprising:
a generator; and
a local interconnect network (LIN) bus, wherein the ECM is connected to the generator by using the LIN bus, wherein after an engine is started, the ECM is configured to send a signal to the generator by using the LIN bus to generate electricity to charge the starting battery.

10. The vehicle, comprising the start control system of claim 1.

11. A start control system for a vehicle, comprising:
an electronic control unit (ECU), configured to send a starting signal;
an air conditioner having a positive temperature coefficient (PTC) thermistor;
a high-voltage battery;
a high-voltage distribution box;
an engine control module (ECM);
an electric motor; and
a starting power supply, wherein the starting power supply comprises:
a starting battery connected to the PTC thermistor of the air conditioner and the ECM; and
a battery management system (BMS), wherein
the ECU is connected to the BMS, and
the BMS is configured to, before the vehicle is started, receive the starting signal sent by the ECU, and detect a temperature of the starting battery, and
in response to detecting that the temperature of the starting battery is less than a preset threshold, directly connect the PTC thermistor of the air conditioner to the starting battery to cause the starting battery to discharge at a high current for a preset time, and to disconnect the PTC thermistor of the air conditioner from the starting battery after the discharging for the preset time, wherein the high-voltage distribution box is controlled to be connected to the high-voltage battery and the electric motor after the discharging for the preset time.

12. The system according to claim 11, further comprising a master control unit located in the high-voltage distribution box, wherein the starting battery is configured to control the master control unit to be closed or opened to control the high-voltage battery and the electric motor to be connected or disconnected.

13. The system according to claim 11, wherein the high current is in a range from 50 A to 450 A.

14. The system according to claim 11, wherein the preset time is in a range from 5 s to 30 s.

15. The system according to claim 1, further comprising: a controller area network (CAN) bus, wherein the ECU is connected to the BMS by the CAN bus.

16. The system according to claim 11, further comprising: a control switch, wherein the BMS controls the control switch to be closed or opened to control the starting battery and the PTC thermistor of the air conditioner to be connected or disconnected.

17. The system according to claim 11, further comprising: a DC-DC converter, wherein the DC-DC converter comprises a high voltage side and a low voltage side, the starting battery is connected to the low voltage side, the PTC thermistor of the air conditioner is connected to the high voltage side, and the DC-DC converter is configured to convert a low-voltage output of the starting battery into a high-voltage output.

18. The system according to claim 11, further comprising: a compressor, wherein the compressor is connected to the high voltage side of the DC-DC converter, so as to increase load consumption of the starting battery.

19. The vehicle, comprising the start control system according to claim 11.

\* \* \* \* \*